(12) United States Patent
Chen (10) Patent No.: US 8,203,843 B2
(45) Date of Patent: Jun. 19, 2012

(54) ELECTRONIC DEVICE AND ENGAGING STRUCTURE THEREOF

(75) Inventor: Ching-Chung Chen, Taipei (TW)

(73) Assignee: Asustek Computer Inc., Taipei (TW)

( * ) Notice: Subject to any disclaimer, the term of this patent is extended or adjusted under 35 U.S.C. 154(b) by 394 days.

(21) Appl. No.: 12/540,158

(22) Filed: Aug. 12, 2009

(65) Prior Publication Data
US 2010/0061045 A1    Mar. 11, 2010

(30) Foreign Application Priority Data
Sep. 5, 2008   (TW) .............................. 97134171 A (51) Int. Cl.
*H05K 7/00* (2006.01)

(52) U.S. Cl. ..................... 361/725; 361/679.58; 361/730

(58) Field of Classification Search ............. 361/679.58, 361/725
See application file for complete search history.

(56) References Cited

U.S. PATENT DOCUMENTS

| | | | | |
|---|---|---|---|---|
| 3,220,078 A | * | 11/1965 | Preziosi ........................ | 411/349 |
| 5,038,250 A | * | 8/1991 | Uenaka et al. ................ | 361/737 |
| 5,278,445 A | * | 1/1994 | Uemura et al. ............... | 257/678 |
| 5,398,156 A | * | 3/1995 | Steffes et al. ............. | 361/679.58 |
| 6,166,324 A | * | 12/2000 | Oldendorf et al. ............ | 174/377 |
| 6,530,629 B2 | * | 3/2003 | Shyr .......................... | 312/223.2 |
| 6,674,638 B2 | * | 1/2004 | Hsien-Chin .............. | 361/679.27 |
| 6,744,627 B2 | * | 6/2004 | Won et al. ................. | 361/679.57 |
| 7,525,793 B2 | * | 4/2009 | Yang et al. ................ | 361/679.55 |
| 8,049,835 B2 | * | 11/2011 | Cheng et al. ..................... | 349/58 |
| 2006/0133019 A1 | * | 6/2006 | Yamazaki et al. ............ | 361/683 |
| 2007/0019371 A1 | * | 1/2007 | Yang ............................ | 361/681 |
| 2009/0015994 A1 | * | 1/2009 | Liu ............................... | 361/679 |

FOREIGN PATENT DOCUMENTS

| | | |
|---|---|---|
| TW | 264982 B | 10/2006 |
| TW | 274242 B | 2/2007 |
| TW | M311928 U | 5/2007 |
| TW | 288919 B | 10/2007 |

* cited by examiner

*Primary Examiner* — Anthony Q Edwards
(74) *Attorney, Agent, or Firm* — Morris Manning & Martin LLP; Tim Tingkang Xia, Esq.

(57) ABSTRACT

The invention discloses an electronic device and an engaging structure thereof. The electronic device comprises a first casing and a second casing. The first casing comprises a plate portion and a plurality of hooks. Each hook is located on the plate portion. The second casing comprises a first side portion, a second side portion, an engaging portion, a first rib and a second rib. The engaging portion is between the first and the second side portions and comprises a plurality of recesses. Each recess is engaged with one of the hooks and has a front edge. A gap is between one end of the hook and the front edge of the recess. The first and second ribs are respectively located on the first and the second side portions. The plate portion is disposed on the first and second ribs. The hook can be detached from the recess by the gap.

14 Claims, 7 Drawing Sheets

ELECTRONIC DEVICE AND ENGAGING STRUCTURE THEREOF

BACKGROUND OF THE INVENTION

1. Field of the Invention

The present invention relates to an electronic device and an engaging structure thereof, and more particularly, to an engaging structure which can be easily and constantly disassembled and reassembled.

2. Description of the Prior Art

Under the vigorous development of information technology nowadays, more and more functions of electronic devices have been unceasingly developed, such as notebook, mobile phone, personal digital assistant (PDA) and electronic dictionary, etc. They are used in various occasions to meet the demands of the consumers. The trend of the design of the exteriors of electronic devices gets more and more complex. Every device is combined of a lot of electronic elements. In former technology, the following methods were generally selected to carry on the assembly: (1) directly spotting rubber among spare-parts, (2) engaging square recess with general hooks, (3) using supersonic wave.

However, the assembly way (1) adopted will have rubber overflows and bad agglutination occurrence, and after agglutinated, detachment will be impossible; the (2) assembly way make it unable to be detached after assembled, the (3) assembly way uses supersonic wave equipment which is costly, and once there is no way to detach once it is agglutinated. In other words, no matter what the methods above is adopted, the element is unable to detach after the assembly. All in all, most of the tradition ways need to employ extra device or material, which not merely increase the cost of production, but also consume larger amount of manpower in the mean time.

SUMMARY OF THE INVENTION

Accordingly, an aspect of the present invention is to provide an engaging structure. The engaging structure of the invention applies specific hook and recess to make the assembly comprising the same to be repeatedly disassembled and reassembled with ease.

According to an embodiment of the invention, the engaging structure includes a first engaging element and a second engaging element. The first engaging element includes a plate portion and a plurality of hooks located on the plate portion. Each hook has an end portion.

The second engaging element includes a first side portion, a second side portion, an engaging portion, a first rib and a second rib. The engaging portion connects the first side portion and the second portion, and the engaging portion has a plurality of recesses. The plurality of recesses is engaged with the hooks. Each recess has a front edge. The first rib is located on the first side portion, and the second rib is located on the second side portion.

In the embodiment, the hook is engaged with the front edge of the recess and is detachable from the recess. When the first engaging element and the second engaging element are assembled, the end of the hook is engaged with the recess first, and then the hook is completely pressed into the recess.

When the hook is engaged with the recess, the plate portion is disposed on the first rib and the second rib. Accordingly, a gap is formed between the end of the hook and the front edge of the recess, and the gap is larger than or equal to zero.

When the first engaging element and the second engaging element are disassembled, the first rib and the second rib can be applied as a pivot, and the end of the hook can be pulled out from the recess based on the gap. Afterward, the first engaging element can be easily detached from the second engaging element by continuous pulling force.

Another aspect of the present invention is to provide an electronic device. The electronic device of the invention applied specific hook and recess to make it easier for the casings to be repeatedly disassembled and reassembled. The specific hook and recess are described above. Because there is no need for extra assembly equipments or materials, the present invention can efficiently decrease the cost, labor and time in producing the electronic device.

The objective of the present invention will no doubt become obvious to those of ordinary skill in the art after reading the following detailed description of the preferred embodiment, which is illustrated in the various figures and drawings.

DETAILED DESCRIPTION OF THE INVENTION

Figure 1:
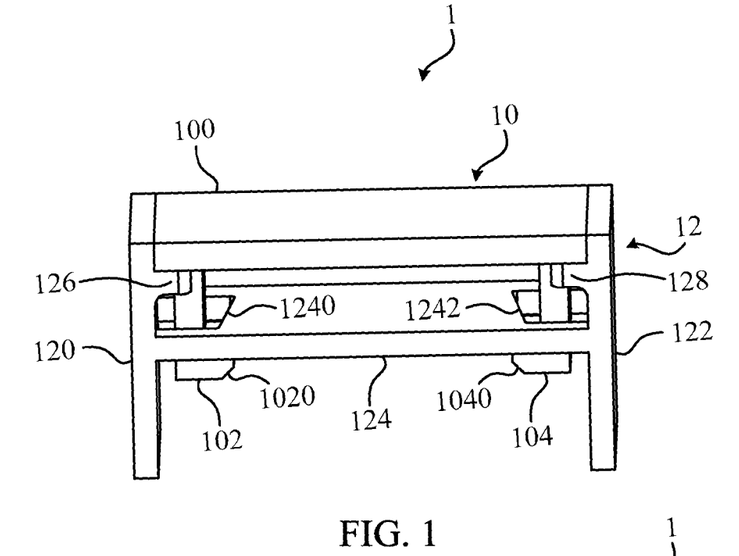
FIG. 1 is illustrating the engaging structure of an embodiment of the invention.
Figure 2:
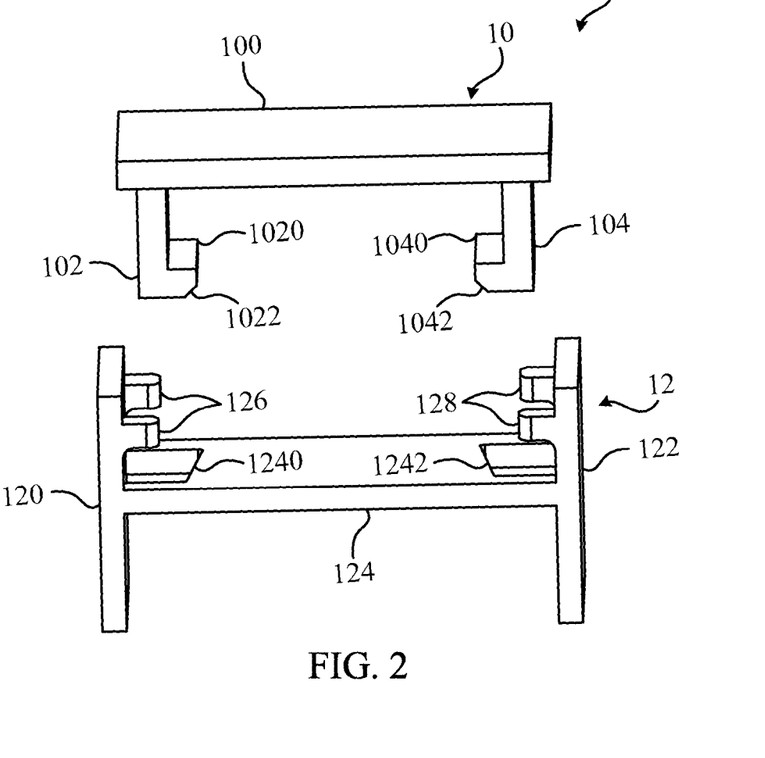
FIG. 2 is an extendable drawing of the engaging structure of FIG. 1.

Please refer to FIG. 1 and FIG. 2. FIG. 1 is a schematic diagram illustrating an engaging structure 1 according to an embodiment of the invention. FIG. 2 is an extendable drawing of the engaging structure 1 of FIG. 1. FIG. 1 is illustrating the engaging structure 1, which is merely something to be described about the technology of the present invention. In other words, the surface of the engaging structure 1 designed should not be confined to the design shown in FIG. 1 it should be applicable in different occasions. The engaging structure 1 can be applied on any electronic device, such as notebook, mobile phone, personal digital assistant (PDA) and electronic dictionary, etc.

As show in FIG. 1 and FIG. 2. The engaging structure 1 includes the first engaging element 10 and the second engaging element 12. The first engaging element 10 includes the plate portion 100 and two hooks 102 and 104. What must be explained is that the trip quantity may be decided according to the practical applications, and not limited to the drawings shown in FIG. 1 and FIG. 2. Hooks 102 and 104 are respectively located on the plate portion 100. The hook 102 comprises end portion 1020 and incline plane 1022, and the hook 104 comprises end portion 1040 and incline plane 1042.

In the embodiment, the hook 102 and the hook 104 are identical structures. However, in other embodiments, in ways that allow the achievement of the same technology the case premises, it is also possible that the hook 102 have a different structure with that of the hook 104. It is determined with practical applications.

The second engaging element 12 includes a first side portion 120, a second side portion 122, an engaging portion 124, a rib portion 126 and a second rib portion 128. The engaging portion 124 is connected between the first side portion 120 and the second side portion 122, and the engaging portion 124 comprises two hooks 1240 and 1242. What must be explained is the recess quantity may coordinate the hook quantity to decide that FIG. 1 and FIG. 2 show are not limited to two. In this embodiment, the recess 1240 is close to the first side 120, and the recess 1242 is close to the second side 122. In addition, the first rib 126 is disposed on the first side portion 120, and the second rib 128 is disposed on the second side portion 122.

Figure 3:
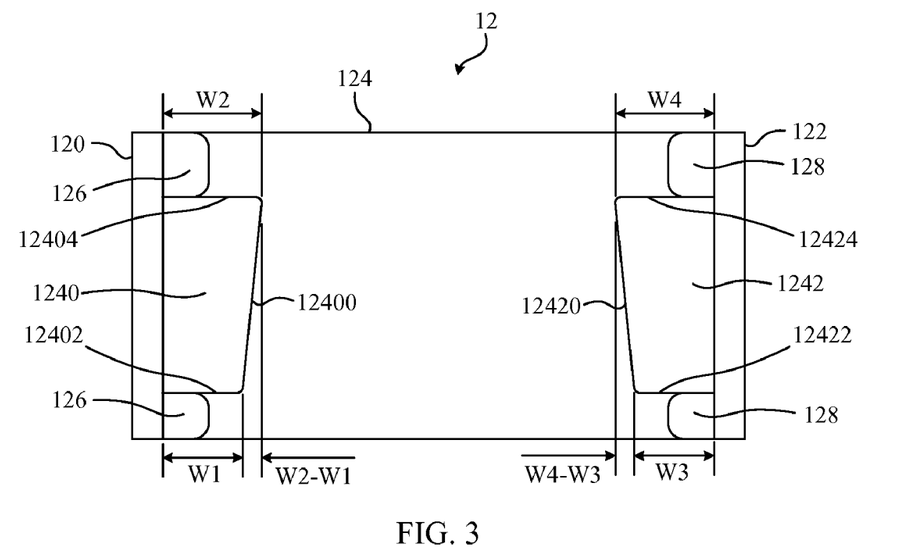
FIG. 3 is a vertical view drawing of the second engaging element of FIG. 2.

Please refer to FIG. 3. FIG. 3 is a vertical view drawing of the second engaging element 12 of FIG. 2. As shown in FIG. 3, the recess 1240 comprises a front side 12400, a first edge 12402, and a second edge 12404. Wherein, the front edge 12400 connects the first side edge 12402 and the second side edge 12404. The first side edge 12402 includes a first width W1 and the second side edge 12404 includes a second width W2. The second width W2 is larger than the first width W1.

In the embodiment, the recess 1240 and the recess 1242 are identical structures. However, in other embodiments, in ways to achieve technology of characteristic the case premised. The recess 1240 structure can also be different with recess 1242. It is must be determined with practical applications.

Figure 4:
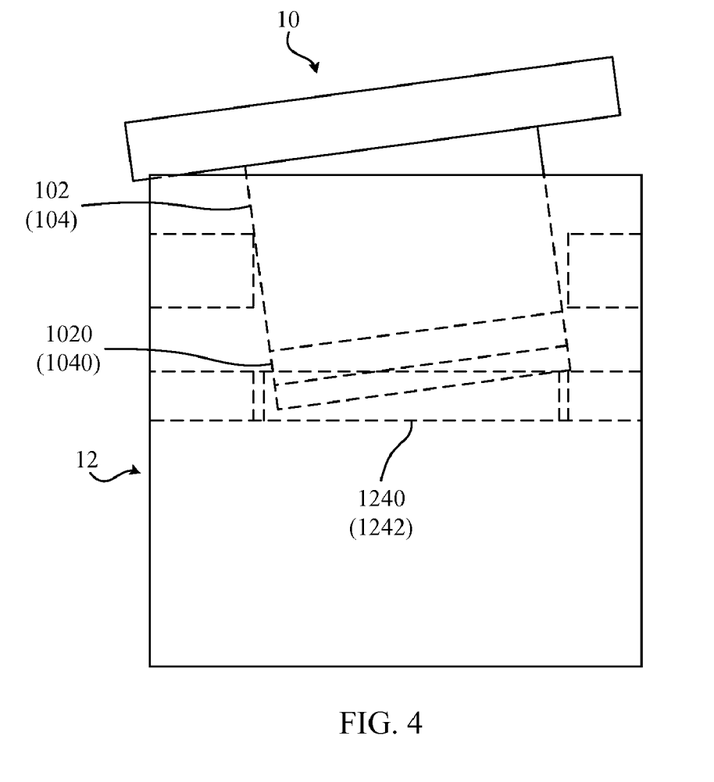
FIG. 4 is an assembly side perspective drawing of the first engaging element and the second engaging element of FIG. 2.

Please refer to FIG. 4. FIG. 4 is an assembly side perspective drawing of the first engaging element 10 and the second engaging element 12 of FIG. 2. Because of the angle of the view, FIG. 4 shows only how the assembly of hook 102 and the recess 1240 assembly are processed. As stated above, because the second width W2 of the second side edge 12404 is larger than the first width W1 of the first side edge 12402. When assembling the first engaging element 10 and the second engaging element 12, the end 1020 of the hook 102 should be engaged to the recess 1240 by the second side edge 12404. Afterward, the hook 102 is completely pressed into the recess 1240.

In assembly process, the incline plane 1022 of the hook 102 can assist the hook 102 to smooth the front edge 12400 of the recess 1240, then, engages with the recess 1240. Likewise, the incline 1042 of the hook 104 can also assist the hook 104 to slide the front edge 12420 of recess 1242, then, engages with the recess 1242. When the hook 102 engages with the recess 1240 and the hook 104 engages with the recess 1242, the plate portion 100 of the first engaging element 10 is located on the first rib 126 and the second rib 128, as show in FIG. 1. After the assembly completes, hooks 102 and 104 are respectively engaged with recesses 1240 and 1242. And the first rib 126, as well as the second rib 128, supports the plate portion 100. Taking advantage of this, the first engaging element 10 then closely and stably engages with the second engaging element 12 in the same place.

Figure 5:
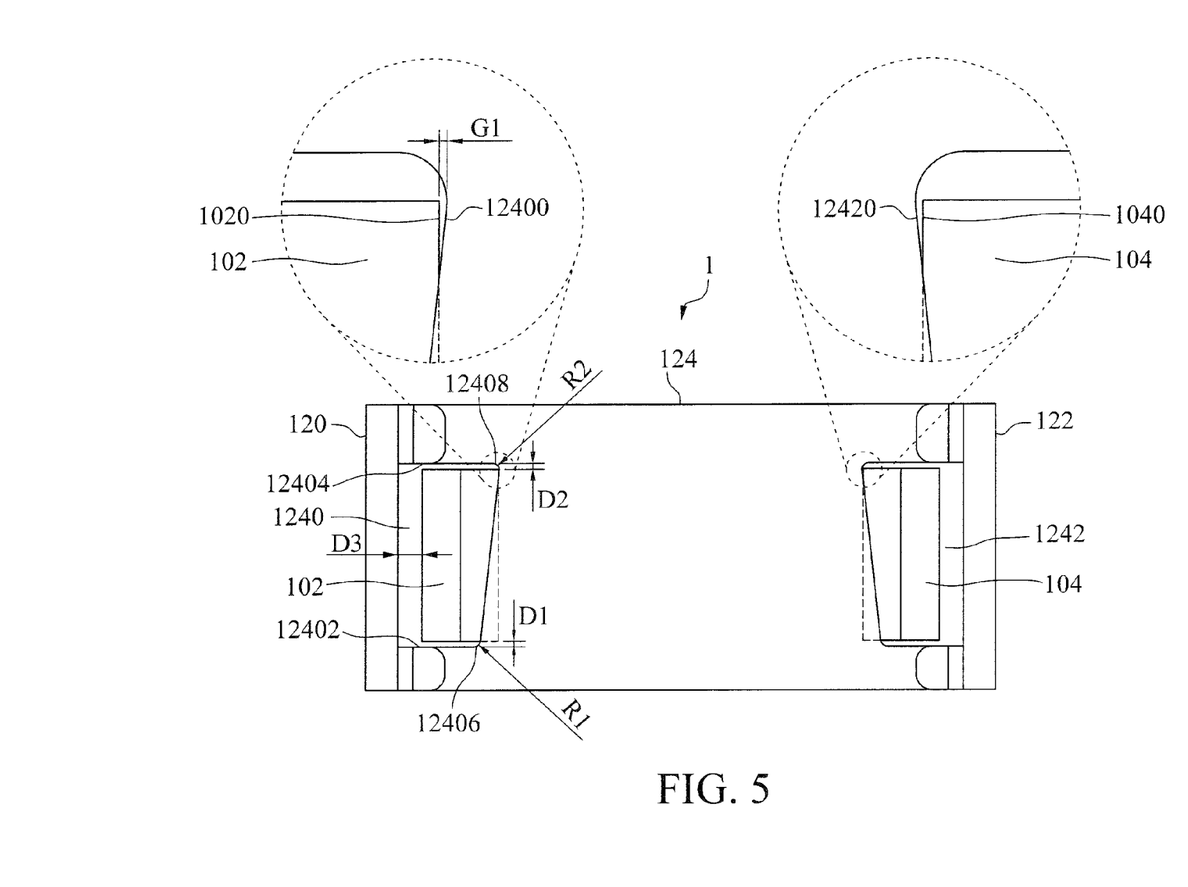
FIG. 5 is a vertical view drawing of the plate portion detached from the engaging structure of FIG. 1.

Please refer to FIG. 5. FIG. 5 is a vertical view drawing of the plate portion 100 detached from the engaging structure 1 of FIG. 1. As show in FIG. 5, the first gap G1 between the end portion 1020 of the hook 102 and the front edge 12400 of the recess 1240. The first gap G1 is larger than zero, which is illustrating in FIG. 5. In another embodiment, the first gap G1 is equal to zero as well. It must be determined with practical applications. When in practical application, the hook 102 is detachable from the recess 1240 based on the existence of the first gap G1. For example, because there is the first gap G1 between the end 1020 of the hook 102 and the front edge 12400 of the recess 1240, the user may pull away the end 1020 of the hook 102 to disconnect the recess 1240, and exert again afterward the first pulling force, then easily disassembles the hook 102 from the recess 1240.

As shown in FIG. 5, when the hook 102 is engaged with the recess 1240, the hook 102 is apart from the first side edge 12402 with a first distance D1, and is apart from the second side edge 12404 with a second distance D2. Furthermore, the recess 1240 has a first round angle 12406 and a second round angle 12408. In the embodiment, the first distance D1 can be larger than or equal to the radius of curvature R1 of the first round angle 12406, and the second distance D2 can be larger than or equal to the radius of curvature R2 of the second round angle 12408.

Because of the above, the first distance D1, the second distance D2, the radius of curvature R1 and the radius of curvature R2, are mutual coordinated. In assembly or detachment process, both sides of the hook 102 have no friction with the first side edge 12402 and the second edge 12404 of the recess 1240, allowing the first engaging element 10 to be smoothly assembled or detached from the second engaging element 12.

As show in FIG. 5, when the hook 102 is engaged with the recess 1240, the hook 102 is apart from the first side portion 120 with a third distance D3. In the embodiment, the third distance D3 can be larger than or equal to the difference between the first width W1 and the second width W2, W2-W1 (as show in FIG. 3). In assembly or detachment process, the third distance D3 allows the hook 102 to be deformed by the retroversion, then smoothly assembled or detached from the recess 1240.

Figure 6:
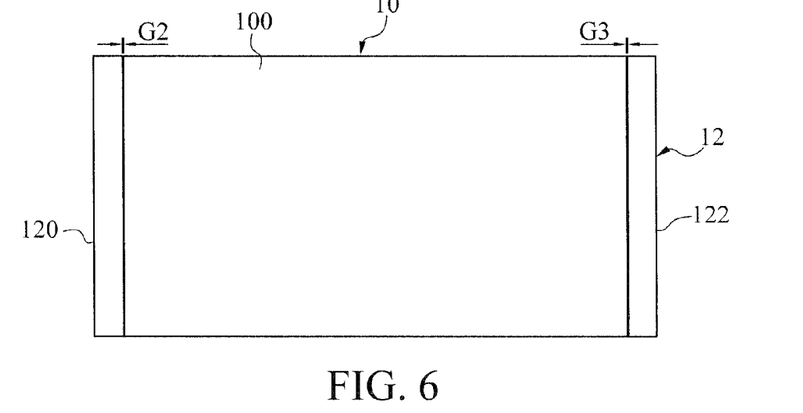
FIG. 6 is a vertical view drawing of the engaging structure of FIG. 1.

Please refer to FIG. 6. FIG. 6 is a vertical view drawing of the engaging structure 1 of FIG. 1. When the plate portion 100 of the first engaging element 10 is disposed on the first rib 126 and the second rib 128 of the second engaging element 12, a second gap G2 is formed between the plate portion 100 and the first side portion 120 and a third gap G3 is formed between the plate portion 100 and the second side portion 122. Taking advantage of this, in assembly or detachment process, the plate portion 100 does not touch the first side portion 120 or the second side portion 122, then, the first engaging element 10 can be more smoothly assembled or detached from the second engaging element 12. In another embodiment, also causing a second gap G2 and a third gap G3 which are equal to zero, is determined with the tolerance interval in practical applications.

Figure 7:
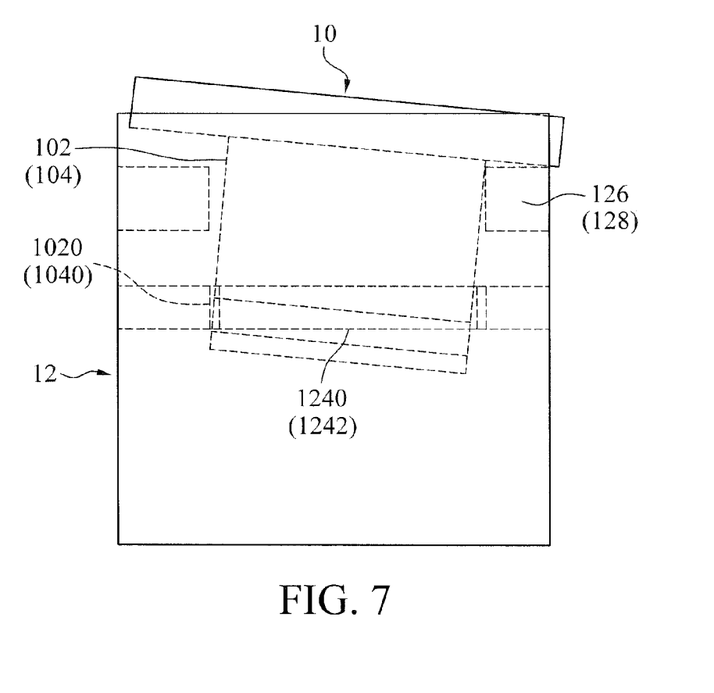
FIG. 7 is a side perspective drawing of the first engaging element detached from the second engaging element of FIG. 1.

Please refer to FIG. 7. FIG. 7 is a side perspective drawing of the first engaging element 10 detached from the second engaging element 12 of FIG. 1. Because of the angle of view, FIG. 7 merely illustrates the process of detachment of the hook 102 and the recess 1240. As stated above, because the second width W2 of the second side edge 12404 is larger than the first width W1 of the first side edge 12402, when it is detached, the first engaging element 10 and the second engaging element 12 use the first rib 126 as the pivot, the first end 1020 of the hook 102 is pulled away by the second side edge 12404 to disconnect the recess 1240.

Please refer to FIG. 5 again. Because there are existing a first gap G1 between the end 1020 of the hook 102 and the front edge 12400 of the recess 1240, user can then easily pull away the end 1020 of the hook 102 to disconnect the recess 1240. Afterward, it continues to exert the pulling force, then, easily disassembles the first engaging element 10 from the second engaging element 12. Particularly, the third distance D3 allows that the hook 102 to be deformed by the retroversion, and because of the first distance D1, the second distance D2, the radius of curvature R1 and the radius of curvature R2 are mutually coordinated. In detachment process, both sides of the hook 102 have no friction with the first side edge 12402 and the second edge 12404 of the recess 1240, allowing the first engaging element 10 smoothly to be detached from the second engaging element 12.

Figure 8:
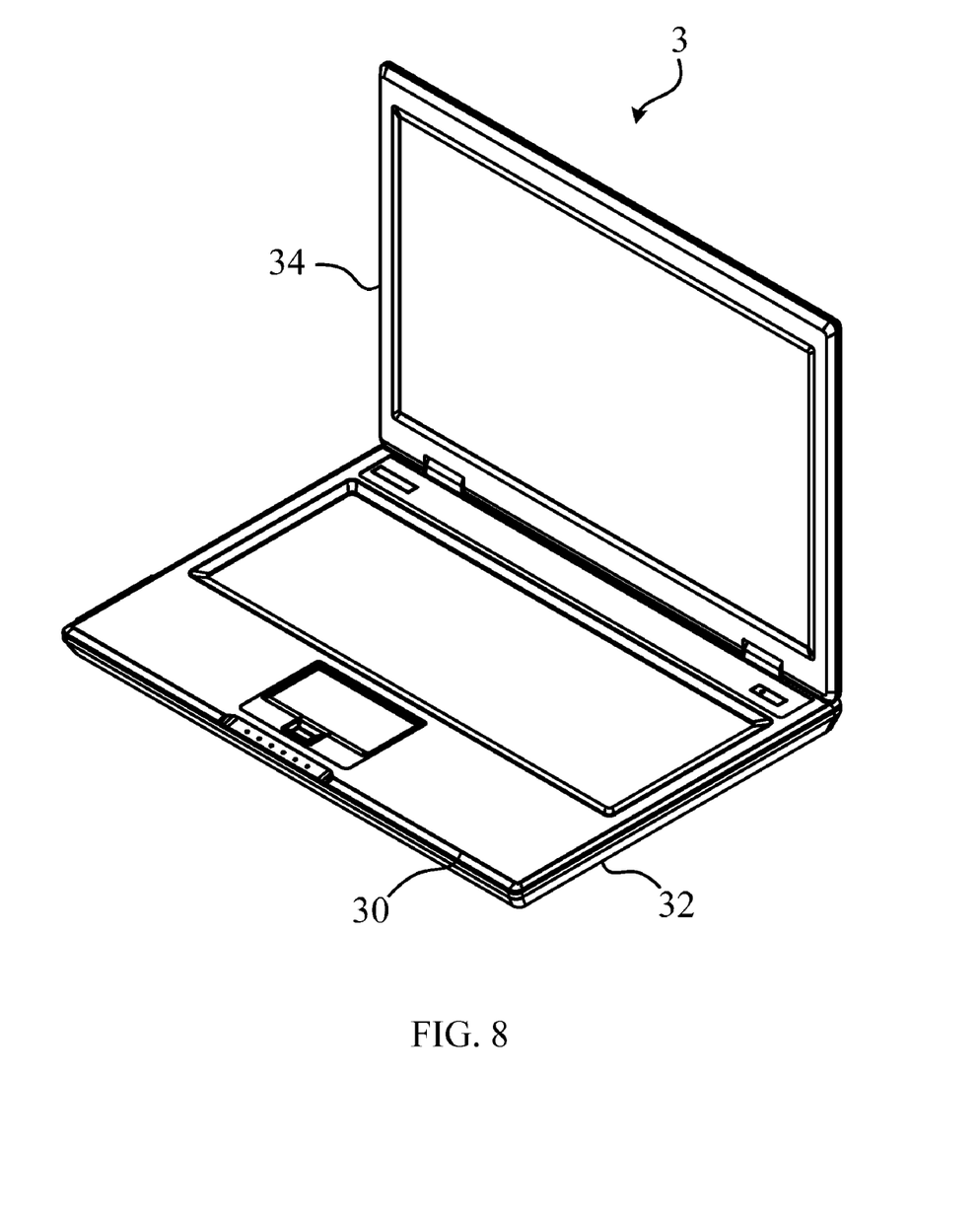
FIG. 8 is illustrating the electronic device of another embodiment of the invention.

Please refer to FIG. 8. FIG. 8 is illustrating the electronic device 3 of another embodiment of the invention. In another embodiment, the invention provides a electronic device 3, the electronic device 3 should take advantage of the engaging structure 1 above to assemble or detach the casing. FIG. 8 is illustrating the electronic device 3, such as a notebook, which merely explains technology of characteristic in the schematic drawing of the invention. In other words, the outward appearance design of electronic device 3 is not limited to which FIG. 8 shows, but has to be determined with practical applications. The electronic device 3 of this invention also includes, for example, mobile phone, personal digital assistant (PDA) and electronic dictionary, etc.

As shown in FIG. 8. The electronic device 3 includes a first casing 30 and a second casing 32. In this embodiment, the electronic device 3 takes a notebook as an example, the electronic device 3 contains a monitor 34, the monitor 34 pin connected on the first casing 30. Generally speaking, the second casing 32 of the electronic device 3 is also equipped with soft and hard parts essential to the operation, such as central processing unit, random access memory, read only memory, storage device, supplies battery of the power source and work system, etc. The function of the above part may be easily achieved by people who are in the know of the technology and utilization, so it will not be explained here.

Figure 9:
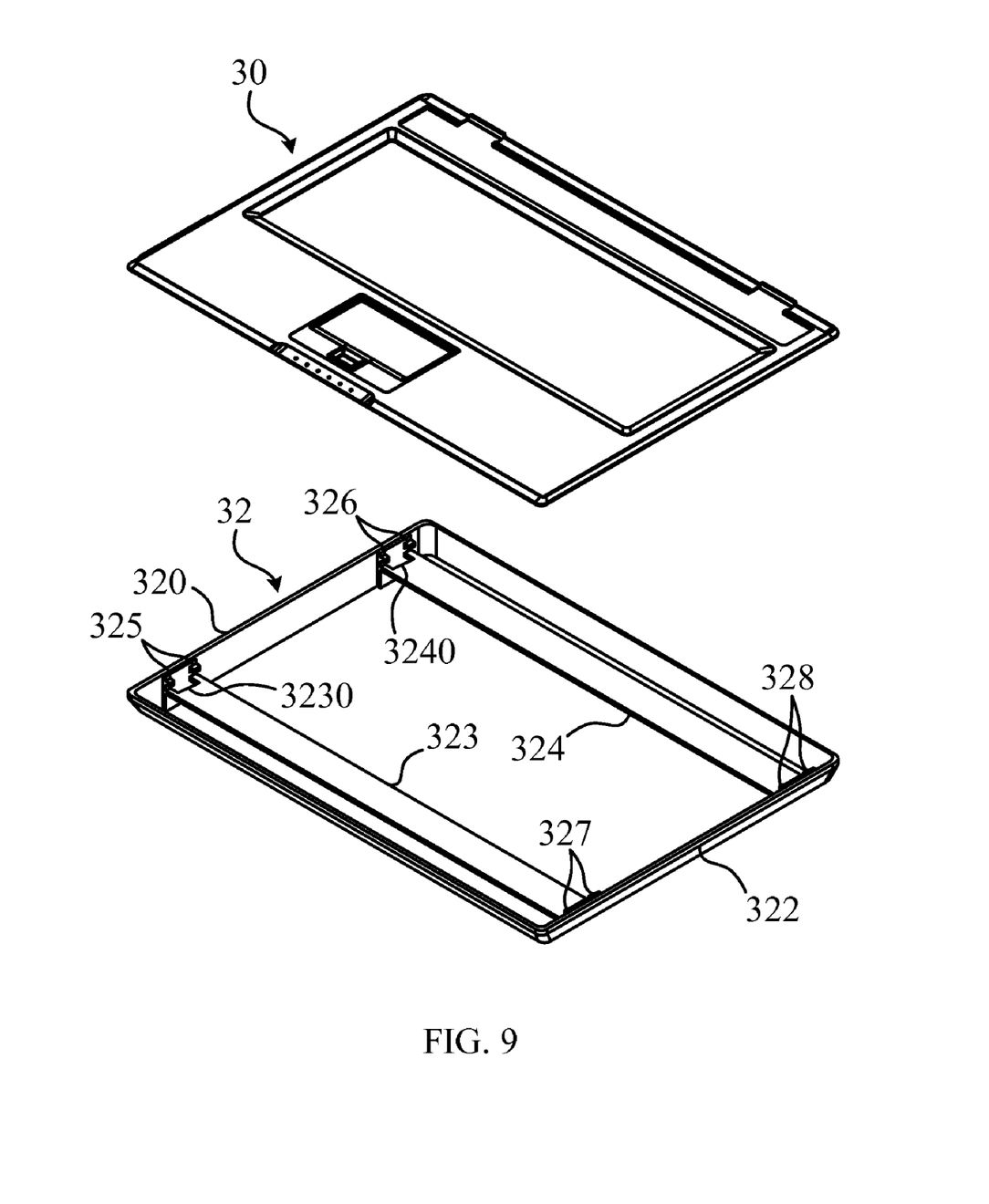
FIG. 9 is an extendable drawing of the first casing and the second casing of FIG. 8.
Figure 10:
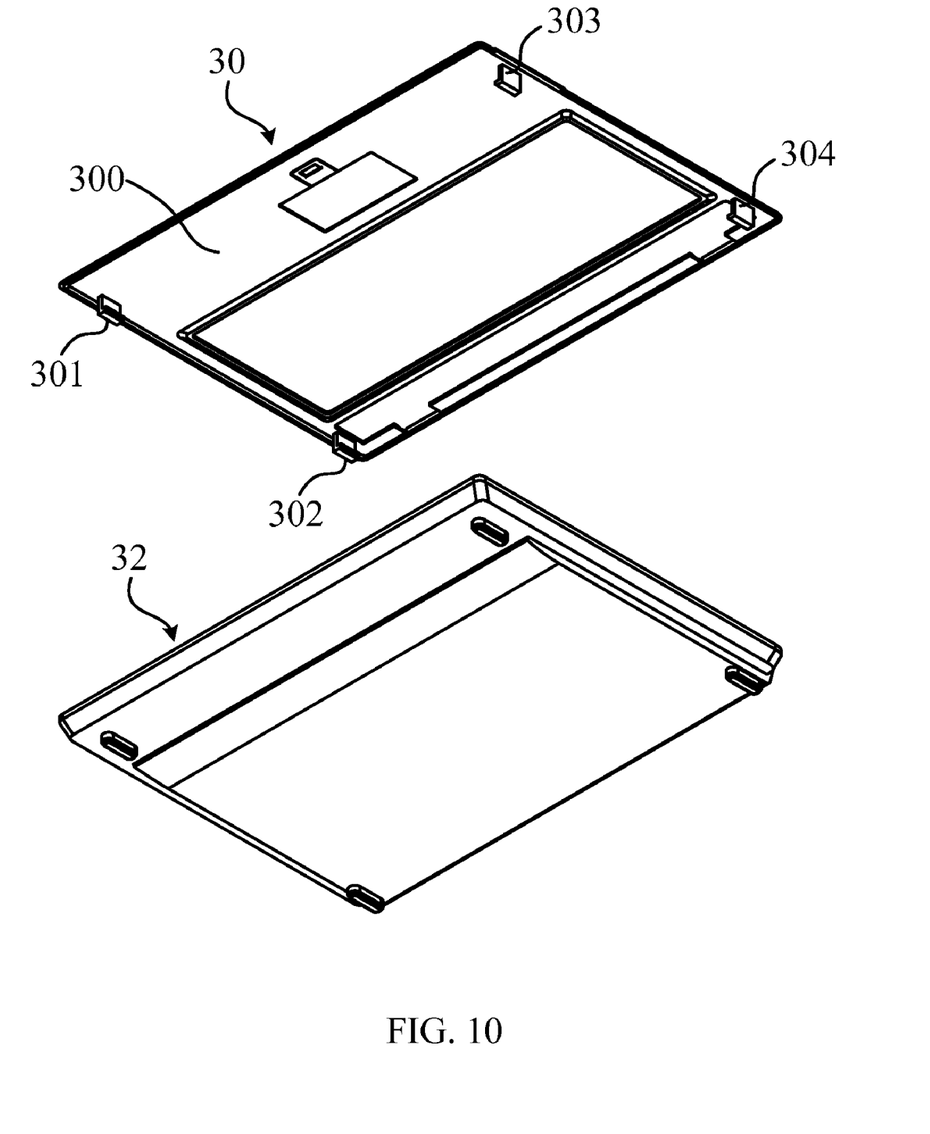
FIG. 10 is another view drawing of the first casing and the second casing of FIG. 9.

Please refer to FIG. 9 and FIG. 10. FIG. 9 is an extendable drawing of the first casing 30 and the second casing 32 of FIG. 8. FIG. 10 is another view drawing of the first casing 30 and the second casing 32 of FIG. 9.

As shown in FIG. 10. The first casing 30 includes a plate portion 300 and four hooks 301, 302, 303, 304. Wherein, the hook 301 and the hook 303 are related, and the hook 302 and the hook 304 are related. What must be explained is the hook quantity act depends on the practical application, and is not limited by four which is shown in FIG. 10. Each of the hooks 301, 302, 303 and 304 respectively located on the plate portion 300. In this embodiment, each of the hooks 301, 302, 303, and 304 and the structural features of hooks 102 and 104 shown in FIG. 2 are completely the same, so it will not be explained here. However, in another embodiment, in achieving technology of characteristic under the premise of the case, the structure of each of the hooks 301, 302, 303, and 304 have slight difference, which must be decided according to the practical applications.

As shown in FIG. 9, the second casing 32 includes a first side edge 320, a second side edge 322, two engaging portions 323, 324, a first rib 325, 326 and a second rib 327, 328. The engaging portion 323, 324 are positioned between the first side portion 320 and the second side portion 322. The first rib 325, 326 is located on the first side portion 320, and the second rib 327, 328 is located on the second side portion 322. Each engaging portion 323, 324 and 124 is illustrated in FIG. 2 with structural features shown completely the same, and each engaging portion 323, 324 has two recesses. As a result of the angle of view shown in FIG. 9, the engaging portion 323 is merely a recess 3230 and the engaging portion 324 is merely a recess 3240.

What must be explained is that the quantity of the recesses on the engaging portion 323, 324 is decided with the quantity of the hooks on the first casing 30. In this embodiment, each of the recesses 3230, 3240 and the structural features of 1240 drawn in FIG. 2 are completely same, no longer explained in this. However, in another embodiment, in achieving technology of characteristic under the case premise, the structure of each of the recesses 3230 and 3240 have the slight difference, which should be decided with practical applications.

Please refer to FIG. 9 and FIG. 10. When assembling the first casing 30 and the second casing 32, the hook 301, 302 are respectively assembled in the recess 3230, 3240, and the hook 303, 304 respectively assembled in another side recess (as a result of the angle of view not shown in the figure). What must be explained is that the structural assemblage of each of the hooks and the recesses are completely the same, so it would not be explained here.

Besides, in the practical application, coordinates spatial disposition of electronic component in the second casing 32, it is possible to separate or to hollow out the engaging portion 323, 324, but the continual plate is not limited by FIG. 9.

To sum up, compared with formerly the technology, this invention takes advantage of designs for special hooks and recesses, which not only might enable the entire engaging structure to achieve in the assembly the outward appearance result, the production output produced might also make it possible for the spare part to be easily disassembled or assembled. In addition, this invention provided the electronic device which uses the special hook and recess to assemble or disassemble the casing. Because it does not need the extra assembly device or the material, this invention may reduce the production costs of the electronic device effectively, the assembly manpower, and the time spent.

Although the present invention has been illustrated and described with reference to the preferred embodiment thereof, it should be understood that it is in no way limited to the details of such embodiment but is capable of numerous modifications within the scope of the appended claims.

What is claimed is:

1. An engaging structure comprising:
   a first engaging element comprising a plate portion and a plurality of hooks located on the plate portion; and
   a second engaging element comprising a first side portion, a second side portion, an engaging portion between the first side portion and the second side portion, a first rib and a second rib, the engaging portion comprising a plurality of recesses engaged with the hooks, the first rib located on the first side portion and the second rib located on the second side portion, the first rib having a first containing space and the second rib having a second containing space, when the first engaging element is engaged with the second engaging element, a first gap is formed between the hook and the recess, the plate portion being disposed on the first rib and second rib, each hook is accommodated in the first containing space and the second containing space, wherein the hooks are detachable from the recess based on the existence of the first gap.

2. The engaging structure of claim 1, wherein the first gap is larger than or equal to zero.

3. The engaging structure of claim 1, wherein the recess comprises a first side edge and a second side edge, when the hook is engaged with the recess, the hook is apart from the first side edge with a first distance and is apart from the second side edge with a second distance, the recess having a first round angle and a second round angle, the first distance being larger than or equal to the radius of curvature of the first round angle, and the second distance being larger than or equal to the radius of the curvature of the second round angle.

4. The engaging structure of claim 3, wherein the first side edge has a first width and the second side edge has a second width, when the hook is engaged with the recess, the hook is apart from the first side portion with a third distance which is larger than or equal to the difference between the first width and the second width.

5. The engaging structure of claim 1, wherein the hook has an incline plane for assisting the engagement of the hook and the recess.

6. The engaging structure of claim 1, wherein when the plate portion is disposed on the first rib and the second rib, a second gap is formed between the plate portion and the first side portion and a third gap is formed between the plate portion and the second side portion, both the second gap and the third gap are larger than or equal to zero.

7. The engaging structure of claim 1, wherein each hook has an end and each recess has a front edge, when the first engaging element is engaged with the second engaging element, the first gap is formed between the end of the hook and the front edge of the recess.

8. An electronic device comprising:
a first casing comprising a plate portion and a plurality of hooks located on the plate portion; and
a second casing comprising a first side portion, a second side portion, an engaging portion between the first side portion and the second side portion, a first rib and a second rib, the engaging portion comprising a plurality of recesses engaged with the hooks, the first rib located on the first side portion and the second rib located on the second side portion, the first rib having a first containing space and the second rib having a second containing space, when the first casing is engaged with the second casing, a first gap is formed between the hook and the recess, the plate portion being disposed on the first rib and second rib, each hook is accommodated in the first containing space and the second containing space, wherein hooks are detachable from the recess based on the existence of the first gap.

9. The electronic device of claim 8, wherein the first gap is larger than or equal to zero.

10. The electronic device of claim 8, wherein the recess comprises a first side edge and a second side edge, when the hook is engaged with the recess, the hook is apart from the first side edge with a first distance and is apart from the second side edge with a second distance, the recess having a first round angle and a second round angle, the first distance being larger than or equal to the radius of curvature of the first round angle, and the second distance being larger than or equal to the radius of the curvature of the second round angle.

11. The electronic device of claim 10, wherein the first side edge has a first width and the second side edge has a second width, when the hook is engaged with the recess, the hook is apart from the first side portion with a third distance which is larger than or equal to the difference between the first width and the second width.

12. The electronic device of claim 8, wherein the hook has an incline plane for assisting the engagement of the hook and the recess.

13. The electronic device of claim 8, wherein when the plate portion is disposed on the first rib and the second rid, a second gap is formed between the plate portion and the first side portion and a third gap is formed between the plate portion and the second side portion, the second gap and the third gap are both larger than or equal to zero.

14. The electronic device of claim 8, wherein each hook has an end and each recess has a front edge, when the first engaging element is engaged with the second engaging element, the first gap is formed between the end of the hook and the front edge of the recess.

* * * * *